United States Patent [19]

Duchon

[11] Patent Number: 5,008,528
[45] Date of Patent: Apr. 16, 1991

[54] INVERTIBLE TRACKBALL

[75] Inventor: Douglas Duchon, Chanhassen, Minn.

[73] Assignee: Logitech S.A., Apples, Switzerland

[21] Appl. No.: 380,092

[22] Filed: Jul. 14, 1989

[51] Int. Cl.⁵ .............................................. G01V 9/04
[52] U.S. Cl. ..................................... 250/221; 340/709
[58] Field of Search .............................. 340/709, 710; 250/231 SE, 221, 229

[56] References Cited

U.S. PATENT DOCUMENTS

| | | | |
|---|---|---|---|
| 4,533,830 | 8/1985 | Beauprey | 340/709 |
| 4,562,347 | 12/1985 | Hovey et al. | 250/221 |
| 4,623,787 | 11/1986 | Kim | 340/710 |
| 4,801,931 | 1/1989 | Schmidt | 340/710 |
| 4,806,917 | 2/1989 | Hosogoe | 340/709 |
| 4,831,736 | 5/1989 | Bryant, Sr. | 340/709 |

Primary Examiner—David C. Nelms
Assistant Examiner—Que Tan Le
Attorney, Agent, or Firm—Harrison & Eakin

[57] ABSTRACT

The present invention relates to cursor control devices for computers, and particularly relates to cursor control devices for personal computers which involve the use of a ball rotatable by the fingers for controlling cursor movement.

7 Claims, 2 Drawing Sheets

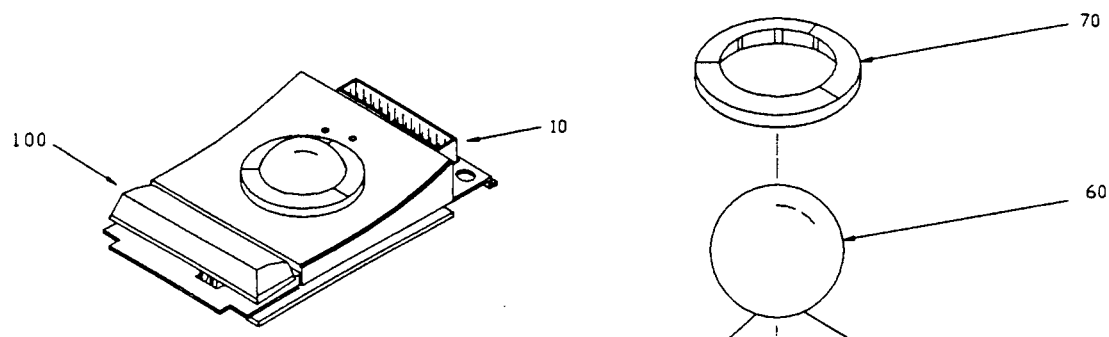
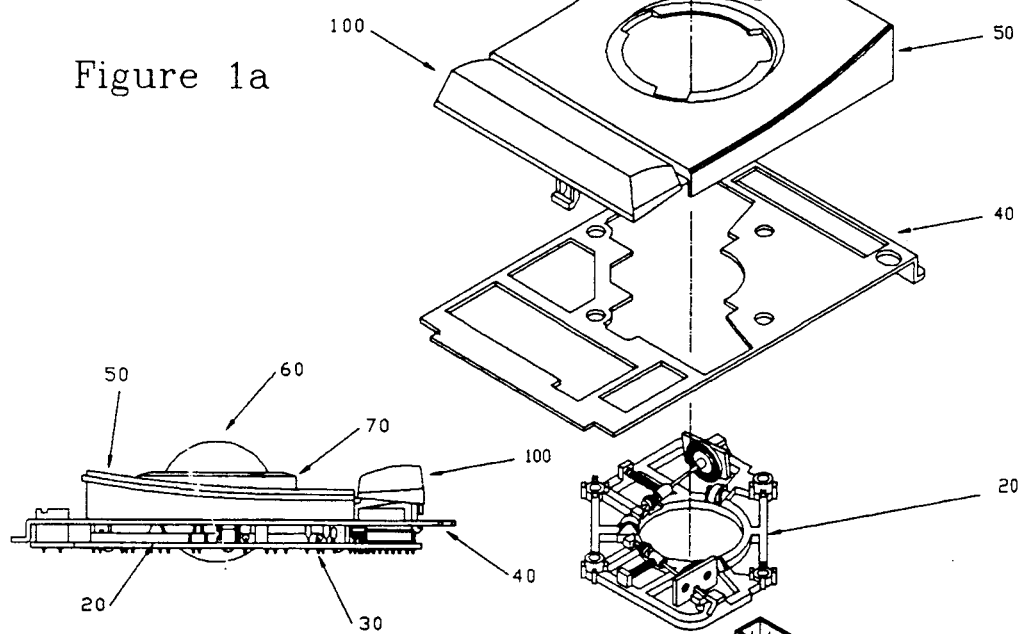
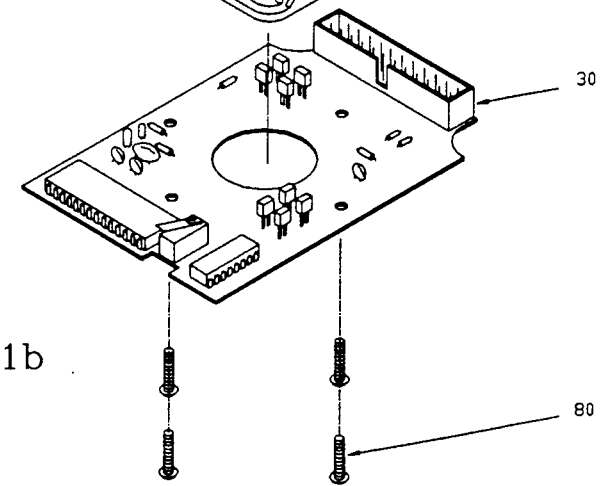
Figure 1a
Figure 1c
Figure 1b

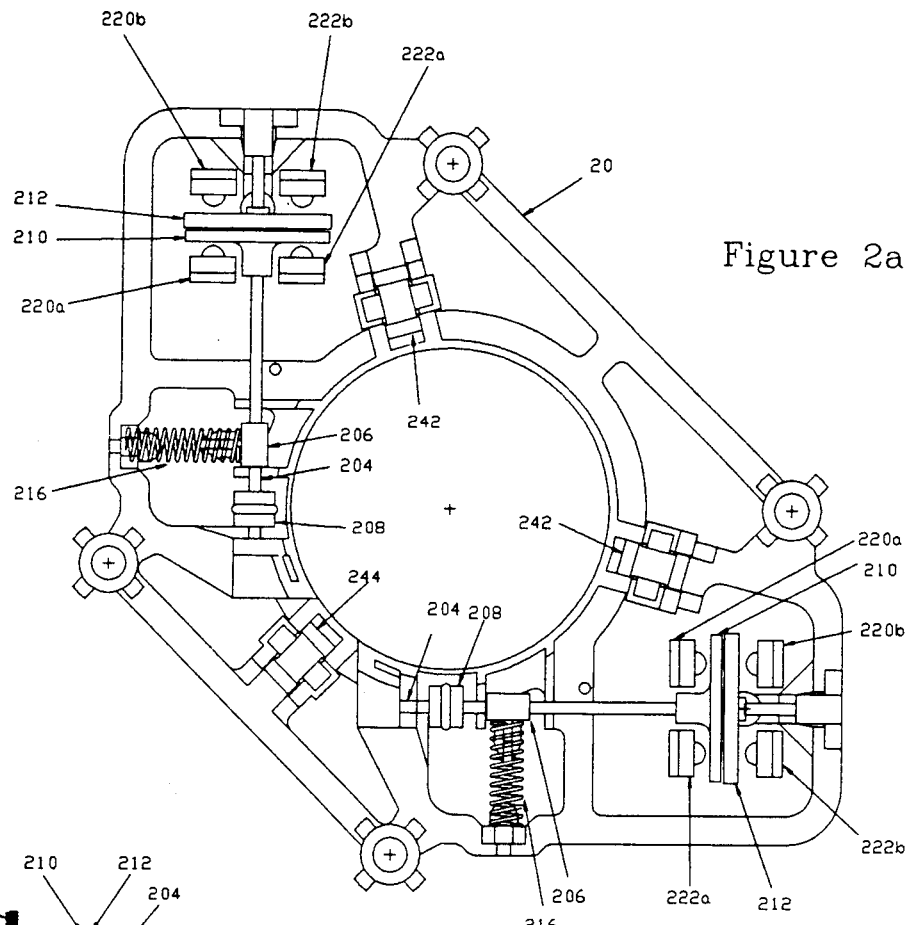
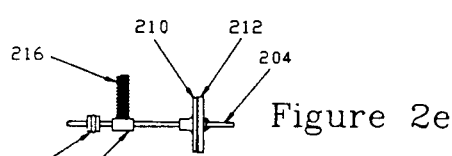
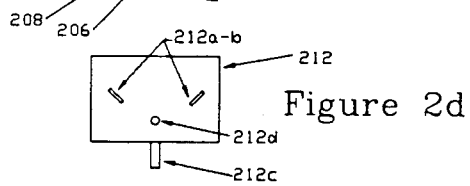
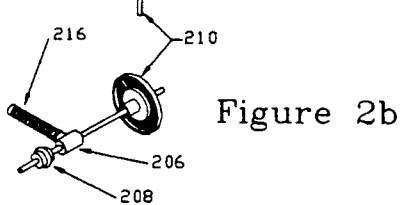
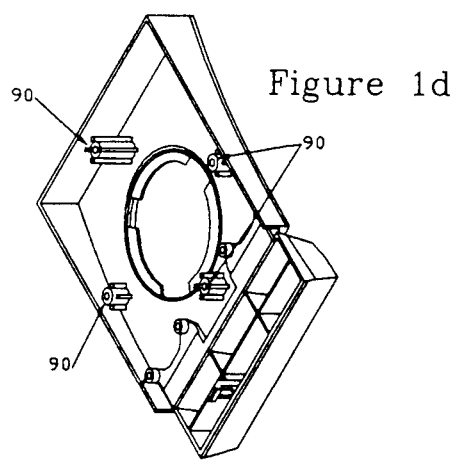

INVERTIBLE TRACKBALL

BACKGROUND OF THE INVENTION

With the burgeoning use of the personal computer and computer workstation, it has become increasingly important to the users of such computers to have convenient control of the cursor on the computer's video display.

The simplest form of cursor control for such computers involves the use of cursor keys, typically located on the keyboard for the computer. However, use of the cursor keys tends to give only very slow and awkward performance. An alternative to the cursor keys is the light pen, which uses a light beam on a special reflective surface to move the cursor.

A more recently developed cursor control device is the electronic mouse. Electronic mouse come in two general types. The first type uses reflection of a light beam off a coded surface to control cursor movement. The more versatile, and more popular, mouse, such as the Logitech C7 mouse manufactured by the assignee of the present invention, provides optomechanical operation which requires nothing more than a flat surface over which the mouse can be rolled. Such electronic mice comprise a case held in the hand. In the bottom of the case is a frictional ball. Cursor movement is controlled by holding the case in the hand such that the ball engages the flat surface. The ball also frictionally engages shaft encoders which convert the analog movement of the ball into digital cursor control. One of the limitations of electronic mice, however, is that they have needed a flat surface of at least several square inches to be used. Such surface area is not always available, and so an electronic mouse is not a solution in all situations.

Another cursor control device is the trackball. Trackballs, while similar to electronic mice, differ in some very significant respects. While mice typically have cases formed to be held in the hand, and thus have relatively small rolling balls, trackballs are designed to have the case remain stationary, with only the ball being rotated. Thus, the ball is markedly larger than for an electronic mouse. In addition, the ball for a mouse must smoothly engage the surface over which it rolls, and thus is typically coated with rubber or similar polymer, and is weighted to ensure good frictional engagement. A trackball, on the other hand, is controlled by direct contact with the hand, and thus needs no such coating since finger pressure can be varied to ensure frictional engagement.

One of the difficulties with trackballs in the past has been that the cases of such trackballs were large, to accommodate the large ball needed for convenient hand movement. In addition, conventional trackballs typically have been intended for use within only a very narrow range of elevational angles, and could not be used in, for example, the inverted position. As the result of these and other limitations, the trackball has been primarily intended as a stationary cursor control device.

There has therefore been a need for a cursor control device which can be used in very limited space, and yet still be capable of reliable operation over a wide range of elevational angles, such as might be encountered in using a laptop computer.

SUMMARY OF THE INVENTION

The aforementioned limitations of the prior art are substantially overcome by the present invention, which provides a trackball device capable of use over a wide range of elevational angles while requiring only very nominal surface area for mounting. In addition, the trackball of the present invention may be configured either to be fixedly mounted to a keyboard, or to be free standing.

In accordance with the present invention, a polymeric ball of a size suitable for manipulation by the fingers or thumb is rotatably sandwiched between a lower housing and an upper retaining ring. Flanges on the upper retaining ring rotationally engage an upper housing, to permit easy removal of the ball from the trackball device.

Rotational movement of the ball is converted to cursor movement through engagement of the ball with optical encoders. The optical encoders may include a mask for improved resolution. The relatively close engagement of the upper retaining ring and lower housing maintain the ball in continuous frictional engagement with the encoders regardless of elevational angle, so that the cursor may be reliably controlled with the trackball device in any position, including inverted.

To facilitate construction and improve reliability, the opto-mechanical encoders of the present invention reside on a modular skeleton which may be removed as a single unit. In addition, the opto-mechanical encoders are urged into engagement with the ball by a simplified but reliable spring arrangement, which reduces manufacturing cost while improving manufacturability.

It is therefore one object of the present invention to provide an improved trackball device.

It is another object of the present invention to provide a trackball device which reliably controls cursor movement at any elevational angle.

Another object of the present invention is to provide a trackball device which can be fixedly mounted to a keyboard.

Still another object of the present invention is to provide a trackball having improved resolution.

Yet another object of the present invention is to provide a trackball having improved ease of construction while at the same time having improved reliability.

These and other features of the present invention will be better appreciated from the appended

FIGURES in which

FIG. 1a is a perspective view of a trackball device in accordance with the present invention;

FIG. 1b is an exploded perspective view of the trackball device of FIG. 1a;

FIG. 1c is a side elevational view of the trackball device of FIG. 1a;

FIG. 1d is a perspective view of the underside of the upper housing of an exemplary trackball device in accordance with the present invention;

FIG. 2a is a plan view of an assembled skeleton for a trackball device in accordance with the present invention;

FIGS. 2b and 2c are perspective and plan views of an optomechanical encoder in accordance with the present invention;

FIG. 2d is an elevational view of a mask for use with the encoders of the present invention; and FIG. 2e is a plan view of an optical encoder in accordance with the present invention with the mask of FIG. 2d mounted thereon.

DETAILED DESCRIPTION OF THE INVENTION

Referring first to FIG. 1a, the trackball device 10 of the present invention may be appreciated from its perspective view. Referring also to FIG. 1b, the trackball device 10 can be seen to include a skeleton 20, sandwiched between a printed circuit board assembly 30 which effectively serves as a lower housing, a mounting bracket 40, and an upper housing 50. A ball 60 fits into a hole in the upper housing 50 and rests against a plurality of pressure rollers maintained on the skeleton 20. The ball 60 may be constructed of one hundred percent polyester, or cast phenolic, or other suitable material.

The ball 60 is held in place against the pressure rollers, described in greater detail hereinafter, by a retaining ring 70 which has flanges on its underside matched for engagement with the opening in the upper housing 50. A plurality of screws 80 or other suitable fasteners maintain relative positions of the upper housing 50, mounting bracket 40, skeleton 20 and printed circuit board assembly 30. In the embodiment shown, the screws 80 engage posts 90 shown on the underside of the upper housing in FIG. 1d. The assembled trackball can be appreciated from FIG. 1c, where the trackball is shown in a side elevational view.

A single function selection bar 100, for causing the operation of a selected function, is shown in FIGS. 1a–d, although those skilled in the art will appreciate that a plurality of function select bars may be provided without departing from the present invention.

Referring next to FIG. 2a, the skeleton 20 of the trackball 10 is shown in plan view. Mounted on the skeleton are all of the mechanical elements of a pair of optomechanical encoders, referred to generally at 200 and 202. The mechanical elements of each encoder include a shaft 204 mounted within a positioner 206 and an engagement wheel 208. Mounted on the shaft is an encoding wheel 210, which has slits in it for the selective passage of light.

The shaft 204 passes through a mask 212, better seen in oversized view in FIG. 2d, which permits the mask to be juxtaposed next to the encoding wheel 210. The mask 212 may be seen to include slits, opposed at 111 or other suitable angle. A post on the mask 212 engages a receiver 213 on the skeleton 20, which serves to position rotatably one end of the shaft 204. The other end of the shaft 204, bearing the engagement wheel 208, is retained within a slotted receiver 214 (another of which also limits the range of movement of the other end of the shaft 204). The engagement wheel is urged into frictional contact with the ball 60 by means of spring 216, which extends between a positioning pin 206 on the shaft 204 and an opposing positioning pin 218 on the skeleton 20. The shaft 204 and associated elements may be better appreciated from FIGS. 2b and 2c, where they are shown in perspective and plan views, respectively. The shaft assembly with the mask 212 positioned next to the encoding wheel is shown in FIG. 2e.

The encoding wheel 210 and mask 212 are positioned between a pair of photosources and photodetectors 220a–b and 222a–b, which are affixed to the printed circuit board 30. The movement of the ball 60 in engagement with the wheels 208 causes the encoding wheel 210 to rotate relative to the fixed slits in the mask 212, so that the photodetectors 220b and 222b generate a quadrature signal, which may be readily converted to a digital signal indicative of position by a manner well known in the art.

To ensure smooth rotation of the ball 60, three pressure rollers 240, 242 and 244 are provided. The rollers 240–244 may be of the shaft-mounted ball bearing type, as shown in FIG. 2a, and provide improved shock loading. The ball 60 rests on the rollers 240–244, and thus does not frictionally engage the opening 246 in the skeleton 20. In other embodiments, however, where such shock loading is not required, it may be desirable to eliminate the pressure rollers 240-244 and to permit direct engagement of the ball 60 with the skeleton 20.

As noted above in connection with the photosources and photodetectors 220a–b, the skeleton 20, once assembled, is located over the printed circuit board assembly 30. The PCB 30, in addition to holding the photosources and photodetectors, also supports a connector 260 by which the trackball 10 may be electronically connected to a personal computer or workstation (not shown). In particular, the trackball and connector are particularly suited to be mounted into a keyboard for a portable or laptop computer, although the trackball of the present invention will work equally well with any other form of computer or workstation. The PCB 30 may also hold a suitable processor or other electronics to manipulate the quadrature signals generated by the photodetectors 220b and 222b. A suitable sensing circuit is disclosed in a co-pending application, Ser. No. 07/357,653, assigned to the same assignee as the present application.

As discussed previously in connection with FIG. 1, the mounting bracket 40 cooperates with the PCB assembly 30 to permit the trackball device 10 to be mounted to a selected keyboard or other receiving unit. In addition, it can be appreciated that the skeleton 20 and mounting bracket 40 are sandwiched between the PCB assembly 30 and the upper housing 50, all of which are fastened together by the screws 80 (FIG. 1b). The screws 80 may be seen to extend through holes 250 in the skeleton 20, as well as holes 252 in the mounting bracket 40.

The ball 60 is then retained within the trackball by the retaining ring 70. The retaining ring 70, which has flanges on its underside, is rotatably locked into place in the opening 270 of the upper housing 50. The inner surface 280 of the retaining ring 70 is beveled to permit easy rotation of the ball 60. The distance between the inside of the retaining ring 70 and the pressure rollers 240–244 is sized to precisely accommodate the ball 60 so that the engagement of the ball 60 with the engagement wheels 208 will be maintained regardless of the elevation angle of the trackball device 10.

It can therefore be appreciated that an improved trackball device has been disclosed, in which virtually all of the moving parts are mounted on a single removable sub-assembly. In this manner, a simple, reliable, easy to manufacture device is created. It can further be appreciated that the use of a mask provides improved resolution, while the cooperation of the lock ring, upper housing, ball and pressure rollers permits operation of the present invention at any elevational angle.

Having fully disclosed one embodiment of the invention, it will be appreciated by those skilled in the art, given the teachings herein, that numerous alternatives and equivalents exist which do not depart from the present invention. It is therefore to be understood that the present invention is not to be limited by the foregoing description, but only by the appended claims.

What is claimed is:

1. A trackball comprising
a lower housing member,
a ball suitable for rotational manipulation by the fingers and generally accessible through the upper surface of the trackball,
a skeleton member having ball receiving means therein for receiving the ball,
a plurality of optomechanical encoders having the mechanical components thereof mounted on the skeleton member and urged into mechanical engagement with the ball, the mechanical components supporting the ball,
an upper housing member having ball retaining means and capable of being fixedly mounted to the lower housing member and thereby fixedly locating at least the skeleton member therebetween.

2. The trackball of claim 1 wherein the skeleton member further includes pressure roller means for rotatably supporting the ball.

3. The trackball of claim 1 wherein the encoders are urged into mechanical engagement with the ball by coil springs.

4. The trackball of claim 1 wherein the optomechanical encoders include a mask and an encoding wheel for generating quadrature signals.

5. The trackball of claim 1 wherein the ball retaining means of the upper member cooperates with the ball receiving means of the skeleton member to maintain the ball in contact with the optomechanical encoders at all elevational angles.

6. A trackball comprising
a ball suitable for rotational manipulation by the fingers and generally accessible through the upper surface of the trackball,
a lower member having mounted thereon a plurality of photosources and photodetectors,
a skeleton member having mounted thereon a plurality of shafts, each shaft having mounted thereon an optical encoding wheel and a ball engagement wheel, each optical encoding wheel being disposed to be located between the photosource and the photodetector, the plurality of shafts providing at least partial support for the ball,
an upper housing adapted to be fixedly mounted to the lower member and for fixedly locating therebetween the skeleton member, the uppoer housing having therein an opening for passing the ball therethrough, and
ball retaining means capable of being fixedly mounted to the upper housing for maintaining the ball in contact with the ball engagement wheels regardless of elevational angles.

7. The trackball of claim 6 wherein the lower member includes printed circuit means.

* * * * *